Figure 1:
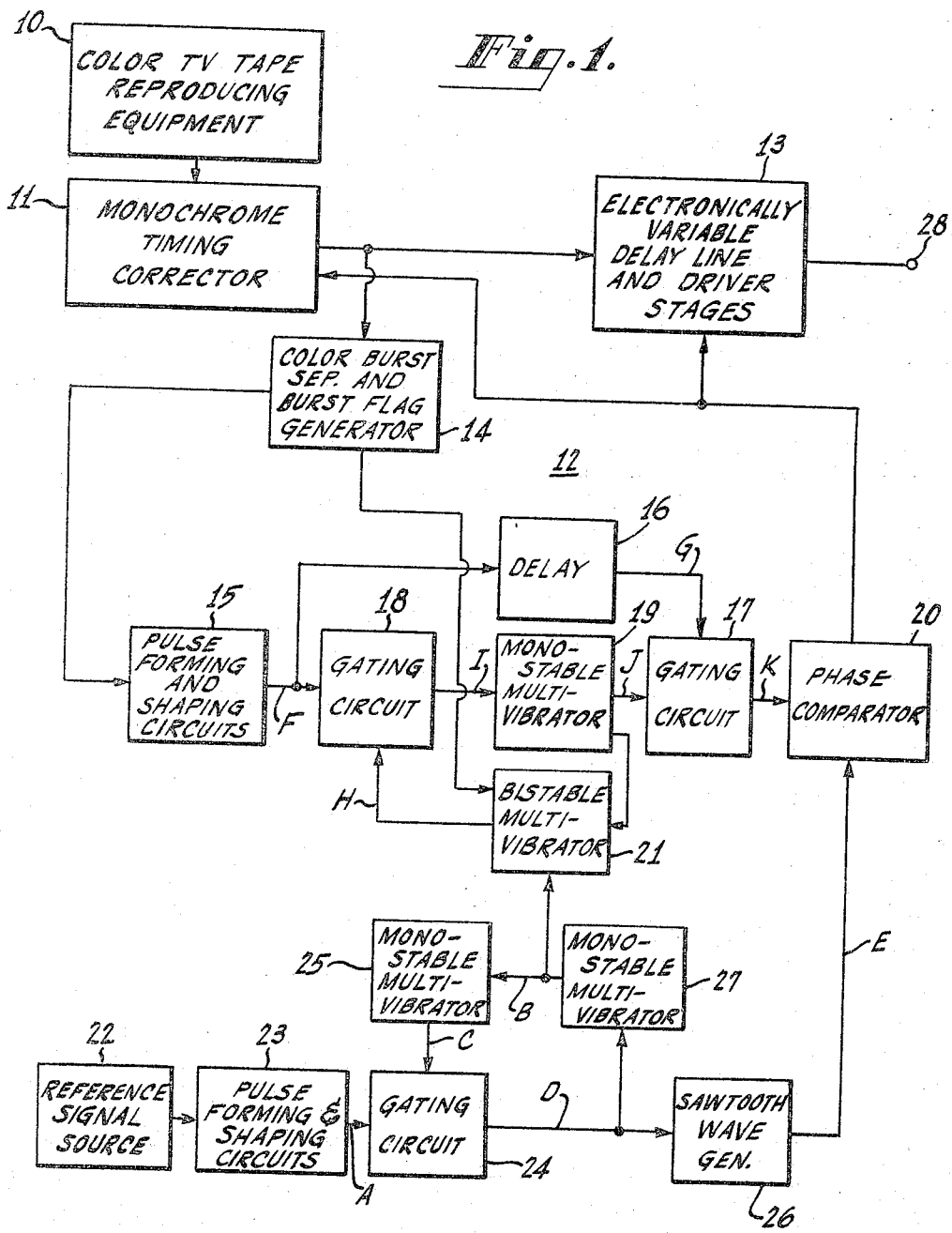

INVENTORS
ROBERT N. HURST &
BY LEE V. HEDLUND

Edward J Norton
Attorney

United States Patent Office
3,312,780
Patented Apr. 4, 1967

3,312,780
PHASE DETECTOR FOR COMPARING A FIXED FREQUENCY AND A VARIABLE PHASE-FREQUENCY SIGNAL
Robert N. Hurst, Cherry Hill, and Lee V. Hedlund, Cinnaminson, N.J., assignors to Radio Corporation of America, a corporation of Delaware
Filed Feb. 23, 1965, Ser. No. 434,401
10 Claims. (Cl. 178—5.4)

This invention relates to phase detectors and, particularly, to an improved phase detector usable in applications where a high-accuracy phase error determination is desired.

Phase detectors now available follow for the most part an approach in which one of two signals to be phase compared is converted into a waveform, for example, a sawtooth wave, having a linearly sloping edge. The second signal is converted by a sampling technique into a series of pulses or sampled intervals. An error signal is derived by comparing the timing of the pulses in the second signal with that of the sloping edge portions of the first signal.

The two paths over which the two signals are processed prior to the actual phase comparison each typically include a number of triggerable elements. The triggerable elements take the form of dividers, multivibrators, gating circuits and other circuits of a type responsive to the level of the received signal. Because the phase information is carried by the timing of the two signals and, therefore, by the moment at which the level of the respective signals exceed a predetermined level, the accuracy of the phase detector is directly determined by the performance of these triggerable elements. As a practical matter, the inherent operation of such elements results in a degree of uncertainty as to the time of triggering, serving to distort the phase information. The phase detector itself introduces a certain amount of irreducible noise. Also, since the waveshapes of the two signals tend to become somewhat distorted as they are processed over the respective paths in the phase detector, particularly in applications employing high-speed pulse trains, additional uncertainty is introduced in the triggering of the triggerable elements with a corresponding increase in the distortion of the phase information carried by the signals and in the noise level introduced by the operation of the phase detector itself.

A further source of difficulty in the operation of phase detectors of the type described is the performance of the above triggerable elements when the phase detector nears either extreme of its range. Assuming that one extreme of the phase relationship possible between two signals to be phase compared is defined as zero degrees and the other extreme of the phase relationship possible between the two signals is defined as three hundred and sixty degrees, the triggerable elements have to respond to a sudden transition in the phase relationship from three hundred and sixty degrees to zero degrees upon either of the two signals rotating through more than three hundred and sixty degrees.

In practice, however, as the phase relationship between the two signals nears a transition, the construction of the previously known phase detectors provides less and less signal energy to trigger the triggerable elements. The amount of signal energy available can become inadequate for this purpose. The operation of the triggerable elements becomes at best uncertain and erratic, increasing the noise level introduced by the phase detector and reducing the accuracy of the phase detector. In cases where the signal energy available actually becomes less than that required to trigger the triggerable elements, the phase detector has a gap or dead band in the transition region during which no phase error information is produced. The above difficulties and others encountered in the operation of previously known phase detectors limit the accuracy obtainable by the phase detectors, particularly, in high frequency applications, and produce significant problem areas as advancements in the art create the need for phase detectors of ever increasing accuracy and dependability.

It is an object of the invention, therefore, to provide an improved phase detector.

Another object is to provide an improved phase detector which, by introducing a minimum of distortion in the phase information carried by the signals to be phase compared, is capable of high-accuracy performance.

A further object is to provide an improved phase detector for use in high frequency applications requiring highly accurate performance.

A still further object is to provide an improved phase detector which introduces no gap or other void in the phase error information produced during a transition in the phase relationship of the signals to be phase compared between one extreme of the range of the possible phase relationships and the other extreme of that range.

Briefly, in one embodiment of the invention described herein, a phase detector is provided having a minimum of circuitry in the respective paths over which a pair of signals are processed prior to the actual phase comparison thereof. Only the most basic, simple circuitry is used in the respective paths with the number of triggerable elements employed being reduced to the lowest number possible. By reducing to a minimum the number of elements capable of distorting the phase information carried by the signals, a phase detector is provided having a high degree of accuracy not heretofore obtainable.

A feature of the invention is the use of a sampling technique which ensures that the phase detector will itself introduce no gap or other void in the phase error information produced. An arrangement including a bistable multivibrator is used so that the amount of signal energy available over the respective signal paths is always sufficient to properly operate the triggerable elements included in the paths. The phase detector operates during the most severe case of a sudden transition in the phase relationship of the two signals between one extreme of the range of phase relationships possible and the other extreme of that range to produce instantly and with accuracy phase error information as to the transition, as well as producing accurate phase error information as to the phase relationship over the range between the two extremes. By this action, the phase detector introduces a minimum of distortion and therefore noise, providing accurate and uninterrupted phase error information as to the phase relationship between the signals being compared.

Figure 2:
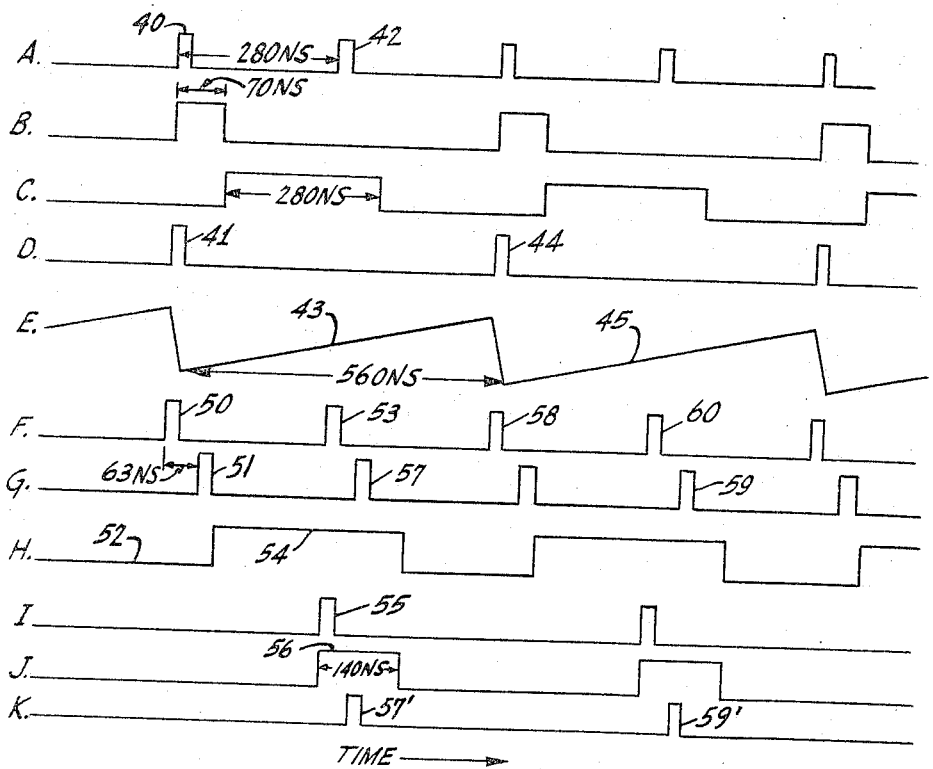
Figure 3:
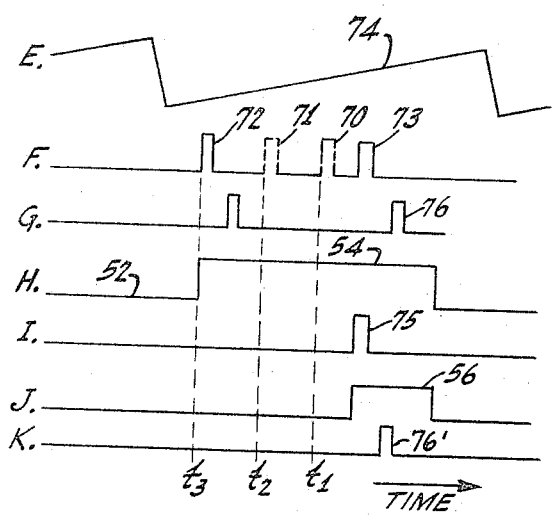

A more detailed description of the invention will now be given in connection with the attached drawing, in which:

FIG. 1 is a block diagram of one embodiment of a phase detector constructed according to the invention; and FIGS. 2 and 3 are each a series of waveforms useful in describing the operation of the embodiment shown in FIG. 1.

In describing the embodiment of the invention shown in FIG. 1, reference will be made to its use in a color automatic timing correction circuit as might be employed with color television magnetic tape reproducing equipment. Such reference is made only by way of example. The invention is in no way limtied to use in such an application but can be used in any application where high-accuracy performance is desired.

A color television tape reproducer 10 is shown in FIG. 1. While the reproducer 10 can take any desired form, a type of quadruplex magnetic tape recording technique is commonly used in such applications. Four magnetic heads are spaced equi-distant about the periphery of a head wheel. The head wheel is made to rotate in a plane substantially at right angles to the direction of tape movement, causing the television signal to be recorded on and reproduced from record tracks extending transversely across the width of the tape. A detailed discussion of a recording and reproducing system of this type may be found in a book by Julian Bernstein entitled "Video Tape Recording," Rider Publisher Inc., 1960, and elsewhere in the literature.

The recording and reproduction of a television signal, whether a quadruplex or other techniques is used, serves to introduce a certain amount of objectionable distortion in the signal. The distortion, which can be caused by jitter in the head wheel, mechanical inaccuracies in the operation of the tape transport and other factors, appears in the signal as timing or phase errors. The presence of the phase errors is particularly significant in the case of a color television signal, since the color information is carried on the television signal by phase modulation. Correction circuits are commonly employed to reduce the timing or phase errors to an acceptable level before the reproduced television signal is fed to utilization circuits.

As shown in FIG. 1, the reproduced television signal is fed from the reproducing equipment 10 to a timing corrector 11, defined as a monochrome timing corrector. While various approaches may be used, one practice followed at the present time is to feed the reproduced signal to an electronically variable delay line. The horizontal sync component or other control signal included in the television signal is separated from the television signal and compared in phase with a locally generated reference signal. The resulting phase error signal is then used to control the timing of the delay line and thereby the amount of correction imparted to the reproduced television signal fed therethrough. In this manner, it is possible to reduce the timing errors present in the television signal to approximately ±30 ns. (nanoseconds) of jitter. A discussion of the delay line approach to timing correction can be found in U.S. Patent 3,019,291, issued to W. D. Houghton on Jan. 30, 1962.

In the case of a color television signal, additional timing correction is desirable. In present practice, the television signal appearing at the output of the monochrome timing corrector 11 is fed to a color timing correcting unit. Since the quality of the reproduced color television signal is directly related to the amount of phase or timing error present in the signal, the proper operation of the color timing corrector requires the use of a phase detector capable of operating at the frequencies of interest with a high degree of accuracy. It is a purpose of this invention to provide a phase detector suitable for use in such an application.

The color timing corrector unit, indicated generally in FIG. 1 as 12, includes a phase detector to be described and an electronically variable delay line assembly 13 which includes the necessary stages for driving the delay line. To the extent that the color timing corrector 12 makes use of a delay line technique for realizing the timing correction, the operation of the color timing corrector 12 is similar to that described in the above Houghton patent and referred to by way of example in connection with the monochrome timing corrector 11. The reproduced color television signal is fed from the monochrome timing corrector 11 to the input of the electronically variable delay line 13 and to a color burst separator and burst flag generator 14. Since the color burst is subject to the same influence as the remainder of the color television signal during the recording and reproducing process, the color burst includes timing (phase) errors representative of those present in the color television signal. The color burst can therefore be used to derive an indication as to the amount of such phase error. Based on the standards now in use, the color burst includes approximately eight cycles at the color subcarrier frequency of 3.58 mc. megacycles) for each television line.

The color burst, which can be removed from the reproduced color television signal by the usual sync separation and gating circuits, is fed from the color burst separator 14 to pulse forming and shaping circuits 15. As a part of this operation, a burst flag is generated which indicates in time the presence of the burst. The pulse forming and shaping circuits 15 operate by suitable limiting and cross-over detection techniques known in the art to convert the color burst into a series of pulses having a phase closely related to that of the zero cross-over of the corresponding cycles of the color burst. Since each color burst includes approximately eight cycles, eight pulses are produced per television line.

The series of pulses appearing at the output of the pulse forming and shaping circuits 15 are fed through a delay means 16 to a first gating circuit 17. The pulses are also fed from the output of the pulse forming and shaping circuits 15 to a second gating circuit 18. The output of a bistable multivibrator 21 serves as a gate control to the gating circuit 18. As more fully described below, the gating circuit 18 is operated in response to its respective inputs to divide-by-two the series of pulses received from the pulse forming and shaping circuits 15. The gating circuit 18 passes every other received pulse so that, for each series of eight pulses received, four of the pulses appear at the output of the gating circuit 18. The pulses appearing at the output of the gating circuit 18 each operate to trigger a monostable multivibrator 19 into its unstable state. The monostable multivibrator 19 has an unstable time period less than the time interval between the pulses received thereby. A first output of the monostable multivibrator 19 is fed to a gate control of the first gating circuit 17. The gating circuit 17 operates in response to its respective inputs to pass any pulses received via the delay 16 from the pulse forming and shaping circuits 15 only during those periods in which the monostable multivibrator 19 is in its unstable state. By this action, only the pulses produced by the pulse forming and shaping circuits 15 which correspond to the pulses appearing at the output of the second gating circuit 18 are passed by the first gating circuit 17. The pulses appearing at the output of the first gating circuit 17, namely, four pulses per television line are fed to one input of a phase comparator 20.

The performance of the second gating circuit 18 in response to the operation of the bistable multivibrator 21 has been mentioned above. The bistable multivibrator 21 is arranged so that, when the bistable multivibrator 21 is in a first one of its stable states, the output of the bistable multivibrator 21 fed to the second gating circuit 18 causes the gating circuit 18 to pass any pulses received by the gating circuit 18 from the pulse forming and shaping circuits 15. In its second or other stable state, the output of the bistable multivibrator 21 fed to the gating circuit 18 holds the gating circuit 18 inoperative (i.e., does not pass) to any pulses received from the pulse forming and shaping circuits 15. A second output of the monostable multivibrator 19 is fed to the bistable multivibrator 21 so that each time the monostable multivibrator 19 returns from its unstable to its stable state the bistable multivibrator 21 is triggered into its above-mentioned second stable state which serves to block the gating circuit 18 from passing any of the pulses received from the pulse forming and shaping circuits 15. It follows, then, that by determining the time at which the bistable multivibrator 21 is triggered into its above-mentioned first stable state, placing the second gating circuit 18 in condition to pass pulses applied thereto from the pulse forming and shaping circuits 15, the divide-by-two action of the second gating circuit 18 can be implemented. The operation of the bistable multivibrator 21 to achieve this result is determined by control information derived from the reference path of the phase detector included in the color timing corrector 12.

The reference path is shown in FIG. 1 as including a reference signal source 22. The source 22 can take the form of a crystal oscillator or other stable oscillator operating at the color subcarrier frequency of 3.58 mc. The reference signal is fed from the source 22 to pulse forming and shaping circuits 23 which may be of substantially the same construction and operation as the pulse forming and shaping circuits 15 referred to above. The output of the pulse forming and shaping circuits 23 is a series of pulses occurring at the 3.58 mc. repetition rate. The series of pulses appearing at the output of the pulse forming and shaping circuits 23 is fed to a third gating circuit 24. The output of a second monostable multivibrator 25 forms a gate control to the gating circuit 24.

The gating circuit 24 operates in a manner described below in response to its respective inputs to divide-by-two the series of pulses fed thereto from the pulse forming and shaping circuits 23. The gating circuit 24 operates to pass every other pulse received from the pulse forming and shaping circuits 23. The series of pulses appearing at the output of the gating circuit 24 are fed to a sawtooth wave generator 26 and to a monostable multivibrator 27. The sawtooth wave generator 26, which can operate in the usual manner by controlling the charge and discharge time of a capacitor or other storage device, converts the received pulses into a series of sawtooth waves. In the embodiment shown in FIG. 1, the sawtooth wave generator 26 is assumed to be one which generates a sawtooth wave having a linearly sloping, leading edge and a rapid transition at its trailing edge. The leading edge of each sawtooth wave so produced extends over a time period equal to the spacing between every other pulse included in the series of pulses produced by the pulse forming and shaping circuits 23. The series of sawtooth waves are fed from the sawtooth wave generator 26 to a second input of the phase comparator 20.

The monostable multivibrator 27 is triggered into its unstable state in response to each pulse received from the third gating circuit 24. The output of the monostable multivibrator 27 is fed to the monostable multivibrator 25 so that each time the monostable multivibrator 27 returns from its unstable to its stable state the monostable multivibrator 25 is triggered into its unstable state. The output of the monostable multivibrator 25 fed to the third gating circuit 24 is determined so that the gating circuit 24 passes any pulses received from the pulse forming and shaping circuits 23 only when the monostable multivibrator 25 is in its stable state. During periods in which the monostable multivibrator 25 is in its unstable state, the gating circuit 24 is held inoperative (i.e., does not pass) to any pulses received from the pulse forming and shaping circuits 23. The divide-by-two operation of the third gating circuit 24 can be implemented by determining the unstable time periods of the two monostable multivibrators 25, 27 with respect to the frequency of the pulses applied to the gating circuit 24 from the pulse forming and shaping circuits 23. In this manner, a divide-by-two operation is achieved without putting triggerable elements directly in the main signal path.

The operation of the second gating circuit 18 in response to the particular one of two possible stable states assumed by the bistable multivibrator 21 has been referred to above. It was pointed out that by determining the time at which the bistable multivibrator 21 assumed that one of its stable states causing the gating circuit 18 to pass pulses received from the pulse forming and shaping circuits 15, the desired divide-by-two operation of the gating circuit 18 can be provided. This function is performed by the monostable multivibrator 27. The bistable multivibrator 21 is made responsive to the output of the monostable multivibrator 27 so that, each time the monostable multivibrator 27 returns from its unstable to its stable state, the bistable multivibrator 21 is triggered into the one of its stable states which permits the gating cricuit 18 to pass pulses from the pulse forming and shaping circuits 15. The gating circuit 18 passes only certain of the pulses received, the particular pulses passed by the gating circuit 18 being determined by the timing of the pluses in the received pluse train relative to the operating cycle of the bistable multivibrator 21 as driven by the two monostable multivibrators 19 and 27.

In order to ensure that only the proper pulses will be passed by the gating circuit 18, use is made of the burst flag produced in the operation of the burst separator 14. The burst flag takes the form of a pulse beginning at or about the start of the color burst and extending at least to the end of the color burst. The flag pulse is fed to the bistable multivibrator 21 in a manner to enable the bistable multivibrator 21 to respond to the operation of the monostable multivibrator 27. In the absence of the flag pulse, the bistable multivibrator 21 can not be triggered into its stable state by which the gating circuit 18 is operated to pass pulses received from the pluse forming and shaping circuits 15. The gating circuit 18 can pass pulses produced during the period of a color burst. Stray or extraneous pulses appearing at the input to the gating circuit 18 at a time outside of a color burst period are blocked, eliminating any problems which the presence of such pulses might cause in the operation of the color timing corrector 12.

The phase comparator 20 operates to compare the timing of each pulse received from the first gating circuit 17 with a substantially linear portion of the sloping leading edge of a sawtooth wave received from the sawtooth wave generator 26 at the time of the pulse. The comparator 20, which in itself forms no part of the present invention, is of the sampled-pulse type in contrast to a continuous type of comparator. While the comparator 20 can take different forms, one approach now in use is to provide a pair of current conducting devices which are arranged to conduct only at the peak of each pulse as the pulse effectively rides on the sloping, leading edge of the sawtooth wave. The devices conduct unevenly determined by the position of the pulse on the edge of the sawtooth wave. One device conducts more heavily when the pulse occurs below a certain point on the sloping edge of the sawtooth wave, the second device conducting more heavily when the pulse occurs above that point. By controlling the charge on a capacitor according to the current conduction of the two devices, an error voltage is derived having a magnitude and polarity directly and linearly related to the phase relationship between the pulses and the sawtooth waves. Regardless of the technique actually used, the comparator 20 operates to compare the phase of the sample pulses with that of the sawtooth waves and to produce an error signal representative of the phase relationship therebetween. The error signal is fed from the comparator 20 to the driver stages of the electronically variable delay line 13 so as to determine the timing correction imparted to the reproduced color television signal. The corrected color television signal appearing at the output of the electronically variable delay line 13 is fed to desired utilization circuits, not shown, via an output terminal 28.

In order to provide a degree of drift compensation, the output error signal of the phase comparator 20 can, as shown in FIG. 1, also be fed to the monochrome timing corrector 11. The monochrome timing corrector 11 includes suitable means for integrating over a relatively long period of time the changes in the error signal. By averaging out the error over a period of time and introducing a corresponding correction in the color television signal at the monochrome timing corrector 11, the timing of the sample color burst pulses as fed to the phase comparator 20 in the color timing corrector unit 12 can be determined so that the sample color burst pulses occur within a desired period or range of the sawtooth waves also applied to the phase comparator 20. That is, the sampled color burst pulses are timed so that they occur in the useful range of correction. It has been found that an automatic timing correction unit including a phase detector circuit 12 as shown in FIG. 1 can reduce timing errors present in a television signal processed thereby to approximately ±6 ns. of jitter or less.

A typical operation of the invention will now be described with the aid of the waveforms shown in FIG. 2. It is assumed that the reference signal source 22 of FIG. 1 is operated to produce an output signal at a frequency of 3.58 mc. The input to the gating circuit 24 from the pulse forming and shaping circuits 23 is shown in waveform A of FIG. 2. As indicated, the pulses of waveform A are spaced approximately 280 ns. apart.

Considering the first pulse 40 of the reference signal shown in waveform A, FIG. 2, it is assumed that the pulse 40 occurs at a time when both of the monostable multivibrators 25 and 27 in the reference path of the phase detector 12 are in their stable state. Bistable multivibrator 21 is in its stable state by which the gating circuit 18 blocks any pulses received from the pulse forming and shaping circuits 15. At the same time, the stable state of the monostable multivibrator 25 causes the gating circuit 24 to be permissive to the pulse 40 applied thereto from the pulse forming and shaping circuits 23. A pulse 41 corresponding to the pulse 40 and shown in waveform D of FIG. 2 appears at the output of the gating circuit 24. Monostable multivibrator 27 is triggered into its unstable state in which it remains for approximately 70 ns., thereafter returning to its stable state. The output of the monostable multivibrator 27 appears as represented in waveform B of FIG. 2. The monostable multivibrator 25 is triggered into its unstable state upon the monostable multivibrator 27 returning from its unstable to its stable state. Once triggered to its unstable state, the monostable multivibrator 25 remains in its unstable state for approximately 280 ns. and then returns to its stable state. The output of the monostable multivibrator 25 applied to the gating circuit 24 is represented in waveform C of FIG. 2.

It has been pointed out above that the gating circuit 24 is made responsive to the output of the monostable multivibrator 25 to block any pulses received from the pulse forming and shaping circuits 23 during those periods in which the monostable multivibrator 25 is in its unstable state. Since as shown in waveforms A and C of FIG. 2, the unstable state of the monostable multivibrator 25 extends beyond the time of the next pulse 42, waveform A, supplied to the gating circuit 24 from the pulse forming and shaping circuits 23, the pulse 42 is blocked. As shown in waveform D, no pulse corresponding to the received pulse 42 appears at the output of the gating circuit 24. The gating circuit 24 is in this manner operated as a divide-by-two stage. A comparison of the waveforms A, B, C and D, FIG. 2, shows that, starting with the pulse 40, the gating circuit 24 is operated in effect to pass every other pulse received from the pulse forming and shaping circuits 23. The pulses so produced and appearing at the output of the gating circuit 24 are applied to the sawtooth wave generator 26.

The sawtooth wave generator 26 produces a train of sawtooth waves shown in waveform E, FIG. 2, timed according to the pulses applied thereto from the gating circuit 24. As shown in waveforms D and E, FIG. 2, the reception of the pulse 41 terminates the previous sawtooth wave, the leading edge of the next sawtooth wave 43 thereafter rising substantially linearly until the time of the next pulse 44 appearing at the output of the gating circuit 24. Thereupon, the next sawtooth wave 45 is formed and so on. Since the timing of each sawtooth wave is a function of the spacing between the pulses applied to the sawtooth wave generator 26, the sawtooth waves are each approximately 560 ns. long including both the leading edge and trailing edge portions of the sawtooth wave. The train of sawtooth waves so produced is fed as one input to the phase comparator 20.

Assuming that a color television signal is now applied from the monochrome timing corrector 11 to the delay line 13 and to the color burst separator and burst flag generator 14, the color burst is fed from the color burst separator 14 to the pulse forming and shaping circuits 15. The pulse forming and shaping circuits 15 function to convert the received color burst into a series of eight pulses per television line. A train of pulses as might appear at the output of the pulse forming and shaping circuits 15 is shown in waveform F of FIG. 2. The pulses occur at substantially a 3.58 mc. rate but will vary in phase from a fixed reference signal at the same frequency in accordance with the distortion or timing error present therein. The pulses as applied from the pulse forming and shaping circuits 15 to the gating circuit 17 through the fixed delay 16 are shown in waveform G of FIG. 2. By way of example, the delay imparted to the pulses by the delay 16 is indicated as approximately 63 ns.

For the sake of description, the pulses corresponding to the color burst and appearing at the output of the pulse forming and shaping circuits 15 are shown in waveform F, FIG. 2, as occurring substantially in phase with the reference pulses appearing at the output of the pulse forming and shaping circuit 23, waveform A, FIG. 2. It has been assumed that at the time of the reference pulse 40, waveform A, the bistable multivibrator 21 is in that one of its stable states which operates the gating circuit 18 to block any pulses applied thereto from the pulse forming and shaping circuits 15. As previously described, the pulse 40 is in effect passed by the gating circuit 24 and triggers the monostable multivibrator 27 into its unstable state. As indicated in waveform B of FIG. 2, 70 ns. after the time of the pulse 40 the monostable multivibrator 27 returns to its stable state. Upon the monostable multivibrator 27 returning from its unstable to its stable state, the bistable multivibrator 21 is responsive to the resulting transition in the output of the monostable multivibrator 27 to shift from its present stable state to its other stable state in which the gating circuit 18 is made to pass any pulses received from the pulse forming and shaping circuits 15. The change in the output of the bistable multivibrator 21 resulting from the change in state of the bistable multivibrator 21 is indicated in waveform H of FIG. 2. The above description of the change in state of the bistable multivibrator 21 assumes that a proper flag pulse is being applied to the bistable multivibrator 21 from the color burst separator and burst flag generator 14, indicating the presence of a color burst.

Referring now to the first pulse 50 shown in waveform F as being applied to the gating circuit 18 from the pulse forming and shaping circuits 15, the pulse 50 occurs at a time before the change in state of the bistable multivibrator 21, waveform H, and while the bistable multivibrator 21 is in its stable state represented in waveform H, FIG. 2, by output signal level 52 which operates the gating circuit 18 to block any pulses applied thereto. The pulse 50 is blocked by the gating circuit 18. The gating circuit 17 is responsive to the stable state of the monostable multivibrator 19 at this time to block the delayed pulse 51 corresponding to the pulse 50 and no further operation occurs. At the time of the next pulse 53, waveform F, produced by the pulse forming and shaping circuits 15 and corresponding to a cycle of the color burst, the bistable multivibrator 21 is in its stable state represented by the output signal level 54, waveform H, FIG. 2, which enables the gating circuit 18 to pass in effect any pulse received from the pulse forming and shaping circuits 15. A pulse 55, waveform I, FIG. 2, corresponding to the pulse 53 appears at the input to the monostable multivibrator 19 from the gating circuit 18. Monostable multivibrator 19 is triggered into its unstable state and remains in its unstable state for approximately 140 ns. The resulting transition in the output signal level of the monostable multivibrator 19 as applied to the gating circuit 17 is shown in waveform J, FIG. 2. The gating circuit 17 is arranged to respond to those periods in which monostable multivibrator 19 is in the unstable state represented by output signal level 56, waveform J, FIG. 2, to pass any pulses received from the delay 16 during such periods. Therefore, pulse 57, waveform G, FIG. 2, which corresponds to the pulse 53 delayed is fed through the gating circuit 17 to an input of the phase comparator 20 as shown by pulse 57' of waveform K. Since the pulse 57 is delayed with respect to the pulse 53 approximately one-half the duration of the unstable period of the monostable multivibrator 19, the pulse 57 occurs well within the unstable period of the monostable multivibrator 19. A complete and undistorted pulse 57 is passed by the gating circuit 17. The phase comparator 20 acts to compare the position of the pulse 57' on the slope of the sawtooth wave 43 and to apply a corresponding error correction signal to the delay line 13.

Following the passage of the complete pulse 57 to the phase comparator 20 through the gating circuit 17 and upon the end of the unstable period of the monostable multivibrator 19, the monostable multivibrator 19 returns to its stable state. The gating circuit 17 is again operated to block any pulses received from the delay 16. The bistable multivibrator 21 is responsive to the transition in the output signal level of the monostable multivibrator 19 to shift back to its stable state in which the gating circuit 18 is blocked from passing any pulses received from the pulse forming and shaping circuits 15. This operation can be seen by comparing waveforms H and J of FIG. 2. The phase detector circuit 12 has now returned to its starting condition. Following the operation described above, the next pulse 58, waveform F, FIG. 2, appearing at the output of the pulse forming and shaping circuits 15 and corresponding to a cycle of the color burst results in no change in the status of the phase detector circuit 12, since the pulse 58 is blocked by the gating circuit 18. The delayed pulse 59, waveform G, FIG. 2, corresponding to the pulse 60, waveform F, FIG. 2, will be completely passed by the gating circuit 17 by the operation described above and its position in time shown by 59' in waveform K compared by the phase comparator 20 with the slope of the sawtooth wave 45. The resulting error correction signal produced by the phase comparator 20 is fed to the delay line 13. The operation of the phase detector circuit 12 continues in the manner described. It follows that, as the pulses of waveform F, FIG. 2, corresponding to cycles of the received color burst advance or retard in phase with respect to the reference pulses of waveform A, FIG. 2, a corresponding change in the error correction signal produced by the phase comparator 20 results.

A feature of the invention is the use of the bistable multivibrator 21 to determine the operation of the gating circuit 18 in response to the pulses appearing at the output of the pulse forming and shaping circuits 15. Once placed in that one of its stable states which operates the gating circuit 18 to pass pulses received by the gating circuit 18, the bistable multivibrator 21 remains in that state at least until a pulse which is sufficient to trigger the monostable multivibrator 19 passes the gating circuit 18. Because of the delay 16, the action of the bistable multivibrator 21 guarantees that the gating circuit 17 will always pass to the phase comparator 20 a complete pulse as produced at the output of the pulse forming and shaping circuits 15. Since the gating circuit 17 is made permissive well before and for a period after a pulse passed thereby, the gating circuit 17 itself introduces essentially no distortions in the timing of the pulse. Each pulse corresponding to a cycle of the color burst and applied to the phase comparator 20 accurately carries the timing of the original cycle of the color burst, essentially no timing distortion having been introduced in the pulse over the path by which the pulse is applied from the pulse forming and shaping circuits 15 to the phase comparator 20. The phase detector circuit 12 itself introduces a minimum of noise in processing the respective inputs to the phase comparator 20, resulting in high accuracy performance on the part of the phase detector circuit 12.

In addition to the degree of accuracy obtainable, a further advantage resulting from the invention is its performance when one of the signals to be phase compared, for example, the color burst, rotates through more than three hundred and sixty degrees with respect to the other or reference signal. That is, the phase detector circuit 12 must suddenly switch from one extreme of its operating range to the other extreme of that range. The phase detector circuit 12 should be able to operate through this transition region without creating any gaps or dead bands during which no phase error information is produced.

Turning to the waveforms of FIG. 2, it was assumed that a phase relationship existed between the reference pulses, waveform A, and the pulses, waveform F, corresponding to the cycles of the color burst such that the phase comparator 20 was operated substantially at the mid-point of its range. For example, pulses 57' and 59', waveform G, are shown as occurring approximately mid-way on that portion of the slope of the respective sawtooth waves 43 and 45, waveform E, over which the phase comparison occurs. As the pulses corresponding to the cycles of the color burst reflect a change in phase, they will move to one side or the other of the mid-way point on the slope, producing a corresponding change in the error correction signal fed to the delay line 13 from the phase comparator 20. FIG. 3 shows a series of waveforms E through J which are similar to the waveforms E through J of FIG. 2, except that the phase of the pulses corresponding to the cycles of the color burst and shown in waveform F is now different from that indicated in FIG. 2. Assume for the moment that a pulse 70 shown in dotted lines originally occurs at a time $t_1$ with respect to the slope of a sawtooth wave. If the phase of the pulses appearing at the output of the pulse forming and shaping circuit 15 now undergoes an advance in phase with respect to that of the reference pulses produced by the pulse forming and shaping circuits 23, a subsequent pulse 71 also shown in dotted lines will appear at the output of the pulse forming and shaping circuits 15 which, instead of occurring at time $t_1$, now occurs at time $t_2$ with respect to the slope of the sawtooth wave. As the pulses corresponding to the cycles of the color burst continue to advance in phase, a point is reached at which a pulse 72 will occur not at times $t_1$ or $t_2$ but at time $t_3$ with respect to the slope of the sawtooth wave.

A comparison of the waveforms F and H of FIG. 3 shows that the pulse 72 occurs substantially at the same time that the bistable multivibrator 21 shifts from its stable state in which the gating circuit 18 blocks all pulses received to its other stable state in which the gating circuit 18 passes the received pulses. The pulse 72 thus occurs at one extreme of the phase comparison range corresponding to that portion of the slope of the sawtooth wave 74 over which the phase detector circuit is operable. Since the next pulse 73 appearing at the output of the pulse forming and shaping circuits 15 occurs 280 ns. later, the pulse 73 occurs higher on the slope of the sawtooth wave 74 near the other extreme of the phase comparison range. As the pulse 72 occurs at the time of the transition in the state of the bistable multivibrator 21, only a portion of the pulse 72 is in effect passed by the gating circuit 18. If the portion of the pulse 72 passed through the gating circuit 18 is insufficient to trigger the monostable multivibrator 19, no further action results. A potential dead band or gap in the phase error information produced by the phase detector circuit 12 exists. By the arrangement of the present invention, however, such occurrence is completely avoided.

Since the monostable multivibrator 19 is not triggered by the appearance of the pulse 72, nothing occurs to change the existing state of the bistable multivibrator 21 at the time of and immediately following the appearance of the pulse 72. The bistable multivibrator 21 remains in its stable state in which the gating circuit 18 passes any pulses received. In a sense, the bistable multivibrator 21 waits for the next pulse 73 at the output of the pulse forming and shaping circuits 15. The application of the pulse 73 to the gating circuit 18 results in a full pulse 75, waveform I, FIG. 3, being applied to the monostable multivibrator 19. As indicated in waveform J, FIG. 3, the monostable multivibrator 19 is triggered into its unstable state. The gating circuit 17 is responsive to the unstable state of the monostable multivibrator 19 to pass the pulse 76, waveform G, FIG. 3, corresponding to pulse 73 delayed to the phase comparator 20 as shown by 76', waveform K, FIG. 3. Upon the monostable multivibrator 19 returning to its stable state, the bistable multivibrator 21 shifts back to that stable state in which the gating circuit 18 blocks any received pulses. The phase detector circuit 12 returns to its original condition.

While the case of an advancement in phase of the color burst has been described, the operation resulting from a retarding of the phase of the color burst with respect to the reference signal is similar and follows from the above description. In either case, the phase detector circuit 12 operates immediately to change from one extreme to the other extreme of its operating range upon a complete three hundred and sixty degree phase reversal of the phase relationship between the compared signals taking place. No dead band or gap during which phase error information is lost can occur in the transition region of the phase detector circuit between the two extremes. A consequence of the above operation and construction is that the phase detector circuit 12 will have no tendency toward hysteresis in the phase-voltage characteristic.

What is claimed is:

1. An apparatus for detecting the phase difference between a first and second pulse train comprising, in combination, a bistable multivibrator having first and second stable states, means responsive to said first pulse train for generating a sawtooth waveform having a period equal to that of said first pulse train, means connected to said multivibrator and responsive to said first pulse train to place said multivibrator in said first stable state a given time after each pulse of said first pulse train, means connected to said multivibrator and responsive to said second pulse train first to produce an output pulse of given duration for each pulse of said second pulse train received while said multivibrator is in said first stable state and a given time thereafter to place said multivibrator in said second stable state, means responsive to said output pulses and to said second pulse train to produce a sampling pulse for each pulse in said second pulse train occurring at the respective times of and corresponding to said output pulses, and means responsive to said sampling pulses and said sawtooth wave to produce an error signal representative of the phase deviation of one of said pulse trains with respect to the other of said pulse trains.

2. An apparatus for detecting the phase difference between a first and second pulse train comprising, in combination, a bistable multivibrator having first and second stable states, means responsive to said first pulse train for generating a sawtooth waveform having a period equal to that of said first pulse train, means connected to said multivibrator and responsive to said first pulse train to place said multivibrator in said first stable state a given time after each pulse of said first pulse train, means connected to said multivibrator and responsive to said second pulse train first to produce an output pulse of given duration for each pulse of said second pulse train received while said multivibrator is in said first stable state and a given time thereafter to place said multivibrator in said second stable state, means to delay said second pulse train an amount to cause each pulse in said second pulse train corresponding to and resulting in the production of one of said output pulses to occur a given time after the leading edge and within the duration of said corresponding output pulse, means responsive to said output pulses and to said delayed second pulse train to produce a sampling pulse for each of said pulses in said second pulse train corresponding to one of said output pulses, means responsive to said sampling pulses and said sawtooth wave to produce an error signal representative of the phase deviation of one of said pulse trains with respect to the other of said pulse trains.

3. An apparatus for detecting the phase difference between a first and second pulse train of substantially the same frequency comprising, in combination, means responsive to said first pulse train for producing a third pulse train having a period twice that of said first pulse train, means responsive to said third pulse train for generating a sawtooth waveform having a period equal to that of said third pulse train, a bistable multivibrator having first and second stable states and connected to said third pulse train producing means in a manner to cause said multivibrator to be placed in said first stable state a given time after each pulse of said third pulse train, means connected to said multivibrator and responsive to said second pulse train first to produce an output pulse of given duration for each pulse of said second pulse train received while said multivibrator is in said first stable state and a given time thereafter to place said multivibrator in said second stable state, means responsive to said output pulses and to said second pulse train to produce a sampling pulse for each pulse in said second pulse train occurring at the respective times of said output pulses, and means responsive to said sampling pulses and said sawtooth wave to produce an error signal representative of the phase deviation between said first and said second pulse trains.

4. An apparatus for detecting the phase difference between a first and second signal of substantially the same frequency comprising, in combination, means responsive to said first signal to convert said first signal into a first pulse train having susbtantially the same frequency and phase as that of said first signal, means responsive to said first pulse train for producing a second pulse train having a period twice that of said first pulse train, means responsive to said second pulse train for generating a sawtooth waveform having a period equal to that of said second pulse train, a bistable multivibrator having first and second stable states and connected to said second pulse train producing means in a manner to cause said multivibrator to be placed in said first stable state a given time after each pulse of said second pulse train, means responsive to said second signal to convert said second signal into a third pulse train having substantially the same frequency and phase as that of said second signal, means connected to said multivibrator and responsive to said third pulse train first to produce an output pulse of given duration for each pulse of said third pulse train received while said multivibrator is in said first stable state and a given time thereafter to place said multivibrator in said second stable state, means responsive to said output pulses and to said third pulse train to produce a sampling pulse for each pulse in said third pulse train occurring at the respective times of said output pulses, and means responsive to said sampling pulses and said sawtooth wave to produce an error signal representative of the phase deviation between said first and said second signals.

5. An apparatus for detecting the phase difference between a first and second signal of substantially the same frequency comprising, in combination, means responsive to said first signal to convert said first signal into a first pulse train having substantially the same frequency and phase as that of said first signal, means responsive to said first pulse train for producing a second pulse train having a period twice that of said first pulse train, means responsive to said second pulse train for generating a sawtooth waveform having a period equal to that of said second pulse train, a bistable multivibrator having first and second stable states and connected to said second pulse train producing means in a manner to cause said multivibrator to be placed in said first stable state a given time after each pulse of said second pulse train, means responsive to said second signal to convert said second signal into a third pulse train having substanmeans responsive to said second signal to convert said second signal, means connected to said multivibrator and responsive to said third pulse train first to produce an output pulse of given duration for each pulse of said third pulse train received while said multivibrator is in said first stable state and a given time thereafter to place said multivibrator in said second stable state, means to delay said third pulse train an amount to cause each pulse in said third pulse train corresponding to and resulting in the production of one of said output pulses to occur a given time after the leading edge and within the duration of said corresponding output pulse, means responsive to said output pulses and to said delayed third pulse train to produce a sampling pulse for each of said pulses in said third pulse train corresponding to one of said output pulses, means responsive to said sampling pulses and said sawtooth wave to produce an error signal representative of the phase deviation between said first and second signals.

6. In a system for reproducing a signal including a subcarrier component of given frequency, an apparatus for limiting the phase deviation of said signal comprising, means responsive to said subcarrier to produce a train of phase-representative pulses, means providing a reference signal at said given frequency which is stable in both frequency and phase, means responsive to said reference signal to produce a second pulse train having a period twice that of said reference signal, means responsive to said second pulse train to produce a time-varying reference wave having a period equal to that of said second pulse train, a bistable multivibrator having first and second stable states and connected to said second pulse train producing means in a manner to cause said multivibrator to be placed in said first stable state a given time after each pulse of said second pulse train, means connected to said multivibrator and responsive to said first pulse train first to produce an output pulse of given duration for each pulse of said first pulse train received while said multivibrator is in said first stable state and a given time thereafter to place said multivibrator in said second stable state, means responsive to said output pulses and to said first pulse train to produce a sampling pulse for each pulse in said first pulse train occurring at the respective times of said output pulses, means responsive to said sampling pulses and said time-varying reference wave to produce an error signal representative of the phase deviation between said reproduced signal and said first-mentioned reference signal, and means for determining the phase of said reproduced signal in response to said error signal.

7. In a system for reproducing a signal including a subcarrier component of given frequency, an apparatus for limiting the phase deviation of said signal comprising, means responsive to said subcarrier to produce a train of phase representative pulses, means providing a stable reference signal at said given frequency, means responsive to said reference signal to produce a second pulse train having a period twice that of said reference signal, means responsive to said second pulse train to produce a sawtooth wave having a period equal to that of said second pulse train, a bistable multivibrator having first and second stable states and connected to said second pulse train producing means in a manner to cause said multivibrator to be placed in said first stable state a given time after each pulse of said second pulse train, means connected to said multivibrator and responsive to said first pulse train first to produce an output pulse of given duration for each pulse of said first pulse train received while said multivibrator is in said first stable state and a given time thereafter to place said multivibrator in said second stable state, means to delay said first pulse train an amount to cause each pulse in said first pulse train corresponding to and resulting in the production of one of said output pulses to occur a given time after the leading edge and within the duration of said corresponding output pulse, means responsive to said output pulses and to said delayed first pulse train to produce a sampling pulse for each of said pulses in said first pulse train corresponding to one of said output pulses, means responsive to said sampling pulses and said sawtooth wave to produce an error signal representative of the phase deviation between said reproduced signal and said reference signal, and electronically variable delay means for adjusting the phase of said reproduced signal and controlled by said error signal.

8. In a system for reproducing a signal of given frequency from a record medium such that said signal is subject to unavoidable and unwanted phase shifts, an apparatus for correcting said phase deviations comprising, means responsive to said signal to produce a train of phase-representative pulses, means providing a stable reference signal at said given frequency, means responsive to said reference signal to produce a second pulse train having a period twice that of said reference signal, means responsive to said second pulse train to produce a sawtooth wave having a period equal to that of said second pulse train, a bistable multivibrator having first and second stable states and connected to said second pulse train producing means in a manner to cause said multivibrator to be placed in said first stable state a given time after each pulse of said second pulse train, means connected to said multivibrator and responsive to said first pulse train first to produce an output pulse of given duration for each pulse of said first pulse train received while said multivibrator is in said first stable state and a given time thereafter to place said multivibrator in said second stable state, means to delay said first pulse train an amount to cause each pulse in said first pulse train corresponding to and resulting in the production of one of said output pulses to occur a given time after the leading edge and within the duration of said corresponding output pulse, means responsive to said output pulses and to said delayed first pulse train to produce a sampling pulse for each of said pulses in said first pulse train corresponding to one of said output pulses, and means for comparing said sawtooth wave and said sampling pulses and for delaying said reproduced signal to maintain the phase relationship of said reproduced signal and said reference signal substantially constant.

9. In a magnetic tape system for storing and thereafter reproducing a color television signal including color subcarrier components having color bursts occurring once during each line of said signal, the phase of said subcarrier varying in an unwanted manner upon the reproduction of said signal, apparatus for correcting said phase deviations comprising, means responsive to said color bursts in said reproduced signal to produce a train of phase representative pulses, means providing a stable reference signal at the frequency of said subcarrier, means responsive to said reference signal to produce a second pulse train having a period twice that of said reference signal, means responsive to said second pulse train to produce a sawtooth wave having a period equal to that of said second pulse train, a bistable multivibrator having first and second stable states and connected to said second pulse train producing means in a manner to cause said multivibrator to be placed in said first stable state a given time after each pulse of said second pulse train, means connected to said multivibrator and responsive to said first pulse train first to produce an output pulse of given duration for each pulse of said first pulse train received while said multivibrator is in said first stable state and a given time thereafter to place said multivibrator in said second stable state, means responsive to said output pulses and to said first pulse train to produce a sampling pulse for each pulse in said first pulse train occuring at the respective times of said output pulses, and means responsive to said sampling pulses and said sawtooth wave to produce an error signal and to maintain the phase relationship of said reproduced signal and said reference signal according to said error signal.

10. In a magnetic tape system for storing and reproducing a color television signal including color subcarrier components having color bursts occurring once during each line of said signal, wherein the storing and reproduction of said signal causes phase shifts between the color subcarrier components and a wave at the nominal color subcarrier frequency, an apparatus for correcting said phase shifts comprising, means responsive to said color bursts in said reproduced signal to produce a train of phase-representative pulses, means providing a second pulse train of stable frequency and phase and having a period twice that of said nominal subcarrier, means responsive to said second pulse train to produce a sawtooth wave having a period equal to that of said second pulse train, a bistable multivibrator having first and second stable states and reponsive to said second pulse train in a manner to cause said multivibrator to be placed in said first stable state a given time after each pulse of said second pulse train, means connected to said multivibrator and responsive to said first pulse train first to produce an output pulse of given duration for each pulse of said first pulse train received while said multivibrator is in said first stable state and a given time thereafter to place said multivibrator in said second stable state, means to delay said first pulse train an amount to cause each pulse in said first pulse train corresponding to and resulting in the production of one of said output pulses to occur a given time after the leading edge and within the duration of said corresponding output pulse, means responsive to said output pulses and to said delayed first pulse train to produce a sampling pulse for each of said pulses in said first pulse train corresponding to one of said output pulses, means responsive to said sampling pulses and said sawtooth wave to produce an error signal representative of the phase deviation therebetween, and an electronically variable delay line responsive to said error signal for delaying said reproduced color television signal to compensate for said phase shifts.

References Cited by the Examiner

UNITED STATES PATENTS 3,100,816    8/1963    Colman et al. _____ 178—5.4

DAVID G. REDINBAUGH, *Primary Examiner.*

J. A. O'BRIEN, *Assistant Examiner.*